US010955144B2

(12) United States Patent
Kim

(10) Patent No.: US 10,955,144 B2
(45) Date of Patent: Mar. 23, 2021

(54) VARIABLE AIR PRESSURE REGULATION DEVICE FOR EXPANSION TANK

(71) Applicant: Joong Ang Engineering Co., Ltd, Incheon (KR)

(72) Inventor: Kyung Joon Kim, Seoul (KR)

(73) Assignee: Joong Ang Engineering Co., Ltd, Incheon (KR)

( * ) Notice: Subject to any disclaimer, the term of this patent is extended or adjusted under 35 U.S.C. 154(b) by 454 days.

(21) Appl. No.: 16/081,675

(22) PCT Filed: Nov. 17, 2017

(86) PCT No.: PCT/KR2017/013077
§ 371 (c)(1),
(2) Date: Aug. 31, 2018

(87) PCT Pub. No.: WO2018/124470
PCT Pub. Date: Jul. 5, 2018

(65) Prior Publication Data
US 2020/0173666 A1    Jun. 4, 2020

(30) Foreign Application Priority Data
Dec. 28, 2016 (KR) ........................ 20-2016-0007592

(51) Int. Cl.
*F24D 19/10* (2006.01)
*F24D 3/02* (2006.01)
(Continued)

(52) U.S. Cl.
CPC ........... *F24D 19/1036* (2013.01); *F24D 1/08* (2013.01); *F24D 3/02* (2013.01); *F24D 3/1016* (2013.01);
(Continued)

(58) Field of Classification Search
CPC .. F24D 19/1036; F24D 19/083; F24D 19/088; F24D 3/02; F24D 3/1016;
(Continued)

(56) References Cited

U.S. PATENT DOCUMENTS 447,100 A * 2/1891 Baker ................ B61D 27/0036
237/37
473,722 A * 4/1892 Baker ................ B61D 27/0036
237/35

(Continued)

FOREIGN PATENT DOCUMENTS

DE    3613906 A1 * 10/1987 ............. G01F 23/00
DE    4320333 A1 * 12/1994 ........... F24D 3/1016
(Continued)

OTHER PUBLICATIONS

International Search Report from corresponding PCT Application No. PCT/KR2017/013077, dated Feb. 28, 2018, and it's English translation.

*Primary Examiner* — Daniel E. Namay
(74) *Attorney, Agent, or Firm* — Harness, Dickey & Pierce, P.L.C.

(57) ABSTRACT

An air pressure regulating device comprises an expansion tank having air stored therein and having an air injection/discharge port at an outside thereof; and a pressure regulation unit provided with a three-way ball valve connected to the air injection/discharge port, a pressure gauge which is installed in any one of flow paths of the three-way ball valve to check an internal pressure of the expansion tank, and a valve core which is installed in a flow path other than the flow path in which the pressure gauge is installed to be capable of injecting or discharging air into or from the expansion tank so as to be capable of controlling the internal pressure of the expansion tank.

2 Claims, 8 Drawing Sheets

(51) Int. Cl.
  *F24D 3/10* (2006.01)
  *F24D 19/08* (2006.01)
  *F24D 1/08* (2006.01)
  *F24H 1/18* (2006.01)
  *F16L 55/05* (2006.01)
(52) U.S. Cl.
  CPC ......... *F24D 19/083* (2013.01); *F24D 19/088* (2013.01); *F24H 1/188* (2013.01); *F16L 55/05* (2013.01); *F24D 2220/0271* (2013.01); *F24D 2220/0278* (2013.01); *F24D 2220/046* (2013.01)
(58) Field of Classification Search
  CPC ............... F24D 3/1008; F24D 3/087; F24D 2220/0271; F24D 2220/0278; F24D 2220/046; F24D 1/08; F24H 1/188; F24H 9/2007; F16L 55/05
  USPC .................. 237/66; 137/207, 565.34, 593
  See application file for complete search history.

(56) References Cited

U.S. PATENT DOCUMENTS

| | | | | |
|---|---|---|---|---|
| 1,904,697 | A * | 4/1933 | Ruppert | F24D 3/087 137/265 |
| 2,166,235 | A * | 7/1939 | Cornell, Jr. | F24D 3/1008 237/66 |
| 2,790,606 | A * | 4/1957 | Morgan | F24D 19/083 237/63 |
| 3,456,673 | A * | 7/1969 | Legrand | F15B 1/265 137/202 |
| 3,628,573 | A * | 12/1971 | Loliger | F16L 55/052 138/30 |
| 4,696,684 | A | 9/1987 | Shen | |
| 4,784,181 | A * | 11/1988 | Hilverdink | B29C 65/56 138/30 |
| 6,041,820 | A * | 3/2000 | Boehme | F24D 3/08 138/30 |
| 6,089,837 | A | 7/2000 | Cornell | |
| 6,401,966 | B2 * | 6/2002 | Tsai | F16L 55/053 220/4.12 |
| 8,375,991 | B2 * | 2/2013 | Erhardt | F24H 9/122 137/625.47 |
| 10,876,739 | B2 * | 12/2020 | Pichette | F24D 3/1008 |
| 2005/0017016 | A1 * | 1/2005 | Lombari | F24D 3/1008 220/721 |
| 2006/0131314 | A1 * | 6/2006 | Lombari | F24D 3/1008 220/721 |
| 2007/0186873 | A1 * | 8/2007 | Polkhouskiy | F24D 3/1008 122/14.2 |
| 2008/0035303 | A1 * | 2/2008 | Fuller | F24D 3/1008 165/11.1 |
| 2008/0035647 | A1 * | 2/2008 | Fuller | G01F 23/0007 220/530 |
| 2008/0099093 | A1 * | 5/2008 | Young | F16L 55/054 138/30 |
| 2008/0179333 | A1 * | 7/2008 | Fuller | F24D 3/1016 220/530 |
| 2010/0000920 | A1 * | 1/2010 | Martinello | F24D 3/1016 210/137 |
| 2011/0240161 | A1 * | 10/2011 | Schneider | F16L 55/053 138/30 |
| 2012/0152959 | A1 * | 6/2012 | Lai | F16L 55/052 220/530 |
| 2013/0180993 | A1 * | 7/2013 | Pichette | F24D 3/1016 220/530 |
| 2014/0158573 | A1 * | 6/2014 | Van Haaren | G01D 13/00 206/459.1 |
| 2015/0167886 | A1 * | 6/2015 | Young | F16L 55/053 137/15.17 |
| 2015/0345802 | A1 * | 12/2015 | Van Haaren | G01M 3/00 220/721 |
| 2017/0261158 | A1 * | 9/2017 | Cogliati | F17C 1/16 |
| 2018/0135658 | A1 * | 5/2018 | Benettolo | F15B 1/22 |
| 2018/0135867 | A1 * | 5/2018 | Pichette | F24D 19/083 |
| 2019/0085536 | A1 * | 3/2019 | Wideman | E03B 11/06 |
| 2019/0145631 | A1 * | 5/2019 | Wideman | F28D 20/0034 122/13.01 |

FOREIGN PATENT DOCUMENTS

| | | | | |
|---|---|---|---|---|
| DE | 19945105 | A1 * | 3/2001 | ........... F24D 3/1008 |
| DE | 19959941 | A1 * | 7/2001 | ............. E03B 7/075 |
| EP | 16316 | A1 * | 10/1980 | ............... F24D 3/10 |
| GB | 2176589 | A * | 12/1986 | ......... F24D 3/1016 |
| GB | 2274329 | A * | 7/1994 | ......... F24D 3/1016 |
| JP | 11349092 | A * | 12/1999 | ............... F24D 3/08 |
| JP | 2001124282 | A * | 5/2001 | ............. F16L 55/05 |
| JP | 2013-164157 | A | 8/2013 | |
| KR | 10-0489554 | B1 | 5/2005 | |
| KR | 20-2012-0001601 | U | 3/2012 | |
| KR | 10-1462071 | B1 | 11/2014 | |
| WO | WO-2006044331 | A2 * | 4/2006 | ........... F24D 3/1008 |

* cited by examiner

VARIABLE AIR PRESSURE REGULATION DEVICE FOR EXPANSION TANK

CROSS-REFERENCE TO RELATED APPLICATIONS

This application is a national phase application of PCT Application No. PCT/KR2017/013077, filed on Nov. 17, 2017, which claims the benefit and priority of Korean Application No. 20-2016-0007592, filed on Dec. 28, 2016. The entire disclosures of the applications identified in this paragraph are incorporated herein by reference.

TECHNICAL FIELD

The present invention relates to an air pressure regulating device, and more particularly to an air pressure regulating device for an expansion tank capable of displaying a pressure of an expansion tank and regulating the pressure of the expansion tank according to a displayed pressure.

BACKGROUND

Generally, in buildings or large facilities, fluid pipes for circulating a large amount of fluid are installed.

The fluid pipe may be a cooling/heating pipe, a cold/hot water pipe, and the like. In the circulation of a fluid in the pipe, temperature, pressure, and volume of the fluid transferred in the pipe are changed according to use situation, surrounding environment, weather, temperature, or the like, and thus, there is a problem in that surging occurs in the fluid pipe according to such a change or the fluid pipe is damaged.

In order to solve the above-mentioned problem, by connecting two or more pumps for transferring fluids in parallel to change the strokes thereof, surging or damage of the fluid pipe is prevented. In addition, by installing an air chamber in the middle of the fluid pipe, surging or damage of the fluid pipe is prevented.

However, the technique of connecting the pumps in parallel has a problem in that the installation cost is greatly increased and the surging is not effectively reduced. In addition, in the technique of installing the air chamber, in order to perform a practical operation, the air chamber needs be installed at the top of the pipe, and thus, a connector is frequently broken by vibration of the air chamber during the operation of the pump, so that it is difficult to apply the technique itself.

In addition, since the compressed air in the upper portion of the chamber is dissolved in the fluid to lower the pressure, there is a problem in that the surging reduction effect also deteriorates.

In order to solve the above-mentioned problems, Patent Document 1 (Korean Patent No. 10-0489554) discloses a surging reduction apparatus having a configuration in which an elastic airbag is provided to compart the air and the fluid by the airbag while effectively responding to the pressure, so that surging of the fluid pipe can be prevented by the air pressure of the airbag.

However, since this apparatus is required to be directly connected to the pipeline, it is difficult to apply this apparatus to large-scale pipelines of buildings or facilities. In addition, since a large amount of the fluid is contained therein, there is a problem in that the apparatus cannot actively respond to a small change in pressure.

In addition, since the air injection port is directly connected between the airbag and the valve, there is a problem in that the above apparatus cannot be variably applied according to the situation when the air is injected or discharged.

SUMMARY

Technical Problem

The present invention has been made to solve the above-mentioned problems, and an object of the present invention is to provide a variable air pressure regulating device for an expansion tank capable of actively responding to a change in pressure of a fluid flowing in a fluid pipe and conveniently checking and regulating a pressure of an expansion tank.

Solution to Problems

According to an aspect of the present invention, there is provided an air pressure regulating device for an expansion tank according to the present invention includes: an expansion tank having air stored therein and having an air injection/discharge port at an outside thereof; and a pressure regulation unit provided with a three-way ball valve connected to the air injection/discharge port, a pressure gauge which is installed in any one of flow paths of the three-way ball valve to check an internal pressure of the expansion tank, and a valve core which is installed in a flow path other than the flow path in which the pressure gauge is installed to be capable of injecting or discharging air into or from the expansion tank so as to be capable of controlling the internal pressure of the expansion tank.

The pressure regulation unit may further include a flow path setting member capable of selectively setting a flow path among the flow path connected to the expansion tank, the flow path provided with the pressure gauge, and the flow path provided with the valve core.

In this case, a protective cap for protecting the valve core and a strap disposed between the protective cap and the valve core to connect and support the protective cap may be further provided outside the valve core.

In addition, a regulation-unit cover coupled to the expansion tank to prevent the pressure regulation unit from being damaged may be further provided outside the pressure regulation unit.

In addition, a drain capable of discharging water to be leaked when the rubber bag inside the expansion tank is burst may be further provided on a bottom of the expansion tank.

Effects of the Invention

The variable air pressure regulating device for an expansion tank according to the embodiment of the present invention has the following effects.

First, since it is possible to actively respond to a change in pressure of a fluid flowing in a fluid pipe, it is possible to prevent the fluid pipe from being damaged.

Second, the fluid can be flowed into the expansion tank and returned to the fluid pipe according to a change in pressure of the fluid pipe, so that it is possible to maintain a constant pressure in the fluid pipe.

Third, it is possible to conveniently check and regulate the internal pressure of the expansion tank which changes depending on the fluid pipe or the surrounding environment.

Fourth, it is possible to selectively change and use the flow paths for air injection, air discharging, and pressure checking.

BEST MODE FOR CARRYING OUT THE INVENTION

In order to achieve the afore-mentioned objects, an air pressure regulating device for an expansion tank according to the present invention includes: an expansion tank having air stored therein and having an air injection/discharge port at an outside thereof; and a pressure regulation unit provided with a three-way ball valve connected to the air injection/discharge port, a pressure gauge which is installed in any one of flow paths of the three-way ball valve to check an internal pressure of the expansion tank, and a valve core which is installed in a flow path other than the flow path in which the pressure gauge is installed to be capable of injecting or discharging air into or from the expansion tank so as to be capable of controlling the internal pressure of the expansion tank.

DETAILED DESCRIPTION

The present invention relates to an expansion tank which is connected to a fluid pipe and can prevent damage of a fluid pipe caused by a change of pressure and relates to a variable air pressure regulating device for an expansion tank, which is capable of easily checking and regulating an internal air pressure of the expansion tank.

Figure 1:
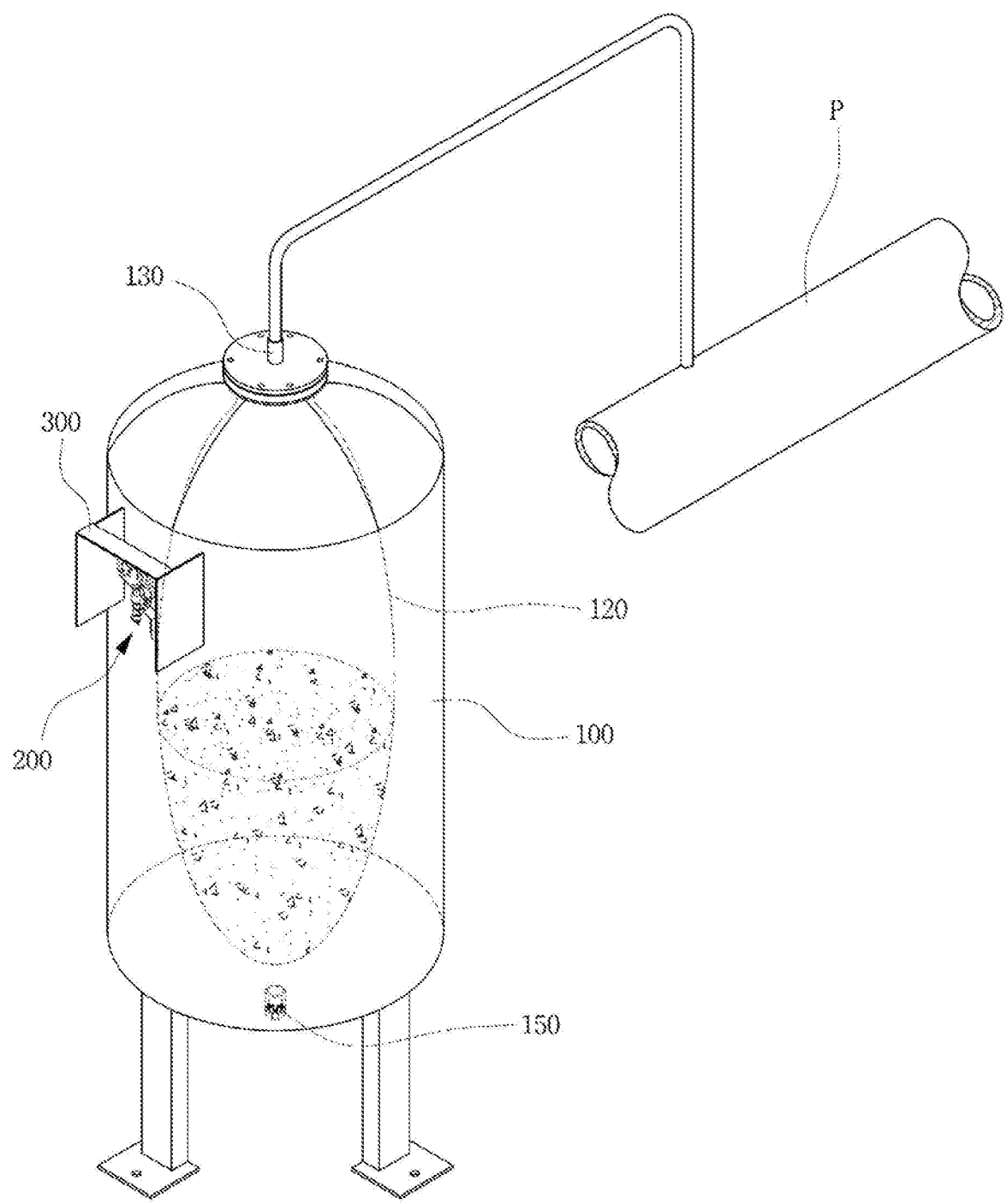
FIG. 1 is an overall perspective view of a variable air pressure regulating device for an expansion tank according to an embodiment of the present invention.
Figure 2:
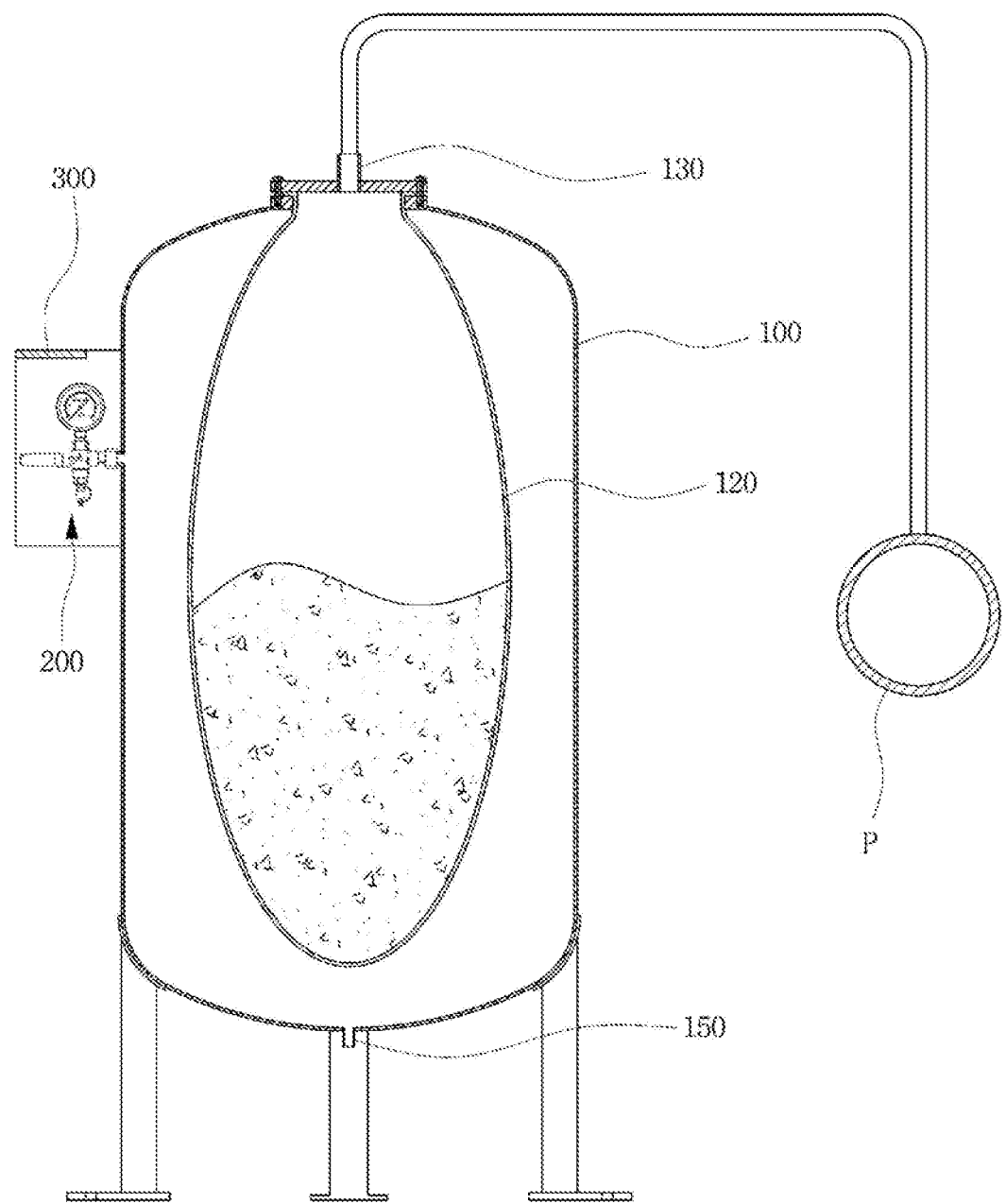
FIG. 2 is a cross-sectional view of the variable air pressure regulating device for an expansion tank according to the embodiment of the present invention.

FIG. 1 is an overall perspective view of a variable air pressure regulating device for an expansion tank according to an embodiment of the present invention, and FIG. 2 is a cross-sectional view of the variable air pressure regulating device for an expansion tank according to the embodiment of the present invention.

Referring to FIGS. 1 and 2, the present invention is configured to mainly include an expansion tank 100, a pressure regulation unit 200, and a regulation-unit cover 300.

The expansion tank 100 is provided with a rubber bag 120 therein and an air injection/discharge port 110 through which air is injected into or discharged from the expansion tank 100 so as to control the pressure. The rubber bag 120 has a fluid pipe connector 130 at an upper portion thereof to be connected to the fluid pipe P.

In addition, air is injected into the space between the rubber bag 120 and the inner wall of the expansion tank 100 at the same pressure as that of the fluid pipe P through the air injection/discharge port 110 and then sealed.

Therefore, the fluid that is expanded due to the change of the pressure of the fluid flowing through the fluid pipe P is flowed into the rubber bag 120 by the pressure difference between the inside of the expansion tank 100 and the fluid pipe P, and thus, the pressure of the fluid pipe P is dispersed, so that it is possible to prevent the fluid pipe P from being damaged and to maintain the fluid pipe P at a constant pressure.

At this time, in the case where the pressure of the fluid pipe P is increased, the fluid in the fluid pipe P is flowed into the rubber bag 120 side. After that, when the pressure of the fluid pipe P becomes low, the fluid is returned to the fluid pipe P side again by the pressure difference between the air injected and sealed into the expansion tank 100 and the fluid pipe P.

In addition, a drain 150 is further provided at a lower portion of the expansion tank 100, so that a fluid is allowed to be easily discharged to the outside when the rubber bag 120 is burst or the fluid leaks.

Figure 3:
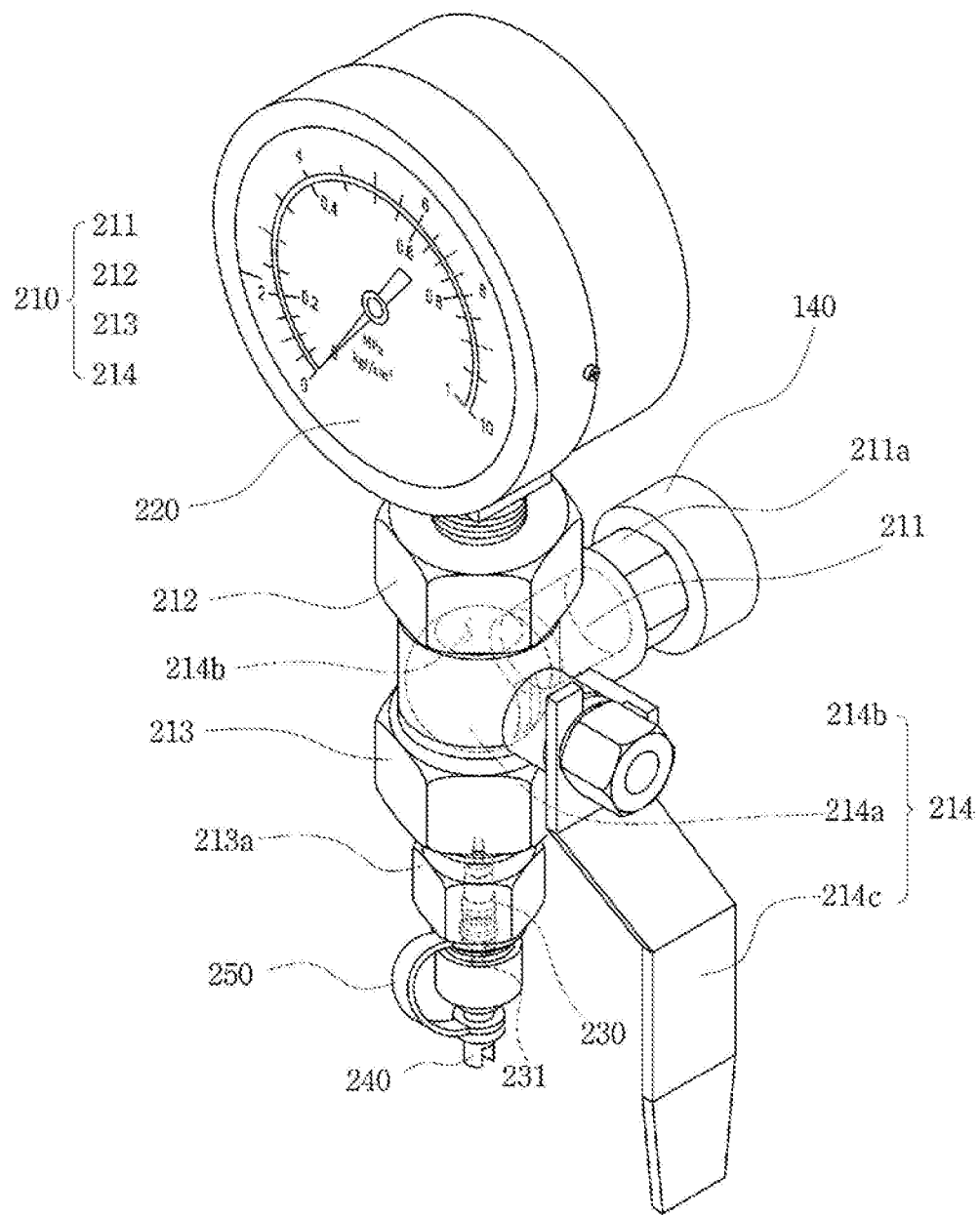
FIG. 3 is a detailed perspective view illustrating a pressure regulation unit of the variable air pressure regulating device for an expansion tank according to the embodiment of the present invention.
Figure 4:
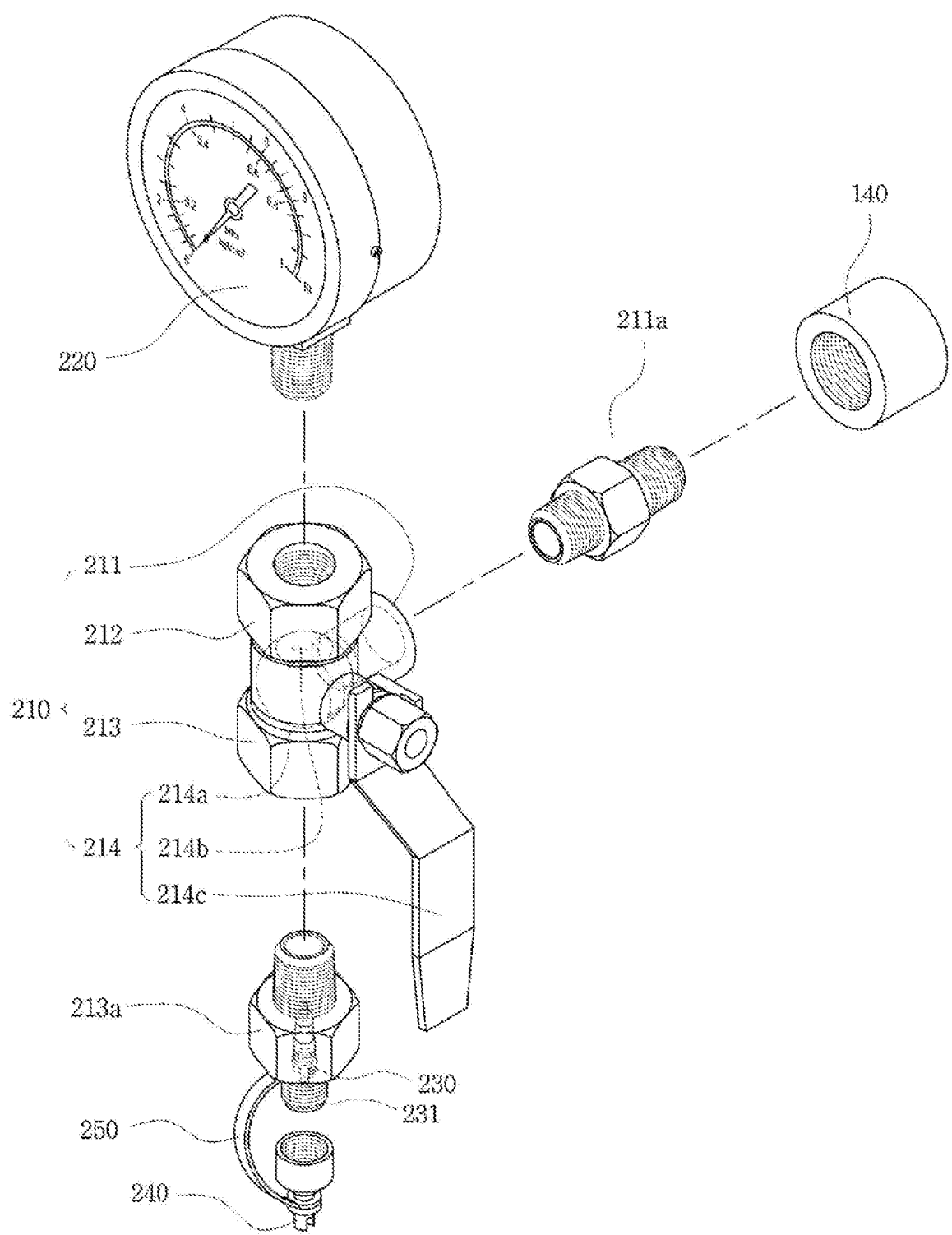
FIG. 4 is a detailed exploded perspective view illustrating the pressure regulation unit of the variable air pressure regulating device for an expansion tank according to the embodiment of the present invention.

FIG. 3 is a detailed perspective view illustrating a pressure regulation unit of the variable air pressure regulating device for an expansion tank according to the embodiment of the present invention, and FIG. 4 is a detailed exploded perspective view illustrating the pressure regulation unit of the variable air pressure regulating device for an expansion tank according to the embodiment of the present invention.

Referring to FIGS. 3 and 4, the pressure regulation unit 200 is a means for regulating the pressure as the internal pressure of the expansion tank 100 is changed. Since the pressure of the air injected into the expansion tank 100 needs to be set according to a change of surrounding environments such as sizes and heights of buildings or facilities, capacity and pressure of heat source equipment, pressures of pumps connected to cooling/heating pipes and cold/hot water pipes, and pressure of a fluid pipe P connected to the expansion tank 100, it is necessary to regulate the pressure to the optimum pressure.

Therefore, the pressure regulation unit 200 is coupled to a flow path formed on a side surface of the air injection/discharge port 110 of the expansion tank 100 by a nipple 211a and a half coupling 140. The the pressure regulation unit 200 is configured to include a three-way ball valve 210 in which three flow paths are formed and which is capable of selectively setting the flow path, a pressure gauge 220 which is coupled to an upper portion of the three-way ball valve 210 to check the internal pressure of the expansion tank 100, and a valve core 230 which is installed in a flow path other than the flow path in which the pressure gauge 220 is installed to be capable of discharging air from the expansion tank 100 or injecting air from the outside into the expansion tank 100.

The three-way ball valve 210 is provided with flow paths extending in three directions, that is, upward, downward, and sideward. The upper flow path 212 is provided with a pressure gauge 220, the lower flow path 213 are coupled to the valve core 230, and the side flow path 211 is coupled to the air injection/discharge port 110 of the expansion tank 100 by the nipple 211a.

A flow path setting member 214 which can selectively change the flow path is further provided at the center where the three flow paths meet.

At this time, the valve core 230 is connected to the lower flow path by a nipple 213a.

The flow path setting member 214 is configured to include a valve 214a having a shape of a ball in which a flow path is formed, a variable flow path 214b in which two flow paths are formed at 90 degrees inside the valve in a penetrating manner, and a hand lever 214c by which the valve 214a is manipulated.

Therefore, by manipulating the flow path setting member 214, it is possible to simply set the flow path to be used.

The valve core 230 is a means for facilitating the injection and discharging of air. The valve core 230 is provided with a spring and a packing which is always pressurized outwards by the air pressure, and thus, the valve core is opened or closed by pushing a switch 231 connected to the packing.

By pushing the switch 231, the air inside the expansion tank 100 can be discharged to the outside. When an air injecting means is connected to the valve core 230, the valve core 230 is opened by pushing the switch 231 by the air injecting device 400, and air can be easily injected into the expansion tank 100 through the valve core 230.

The valve core 230 is further provided with a protective cap 240 for preventing the valve core 230 from being opened or damaged by external factors.

The protective cap 240 covers the bottom of the valve core 230 and is connected to the valve core 230 through a strap 250, so that a risk of loss can be minimized at the time of attaching and detaching.

On the other hand, the regulation-unit cover 300 is further provided on the outer side of the pressure regulation unit 200.

The regulation-unit cover 300 is integrally provided in the expansion tank 100. The upper portion and the two sides of the pressure regulation unit 200 are blocked by the regulation-unit cover 300, and the lower portion of the regulation-unit cover 300 is open, so that it is possible to prevent the pressure regulation unit 200 from being damaged during the equipment construction or during the using, and it is possible to easily connect the air injecting means to the lower portion at the time of air injection.

Figure 5:
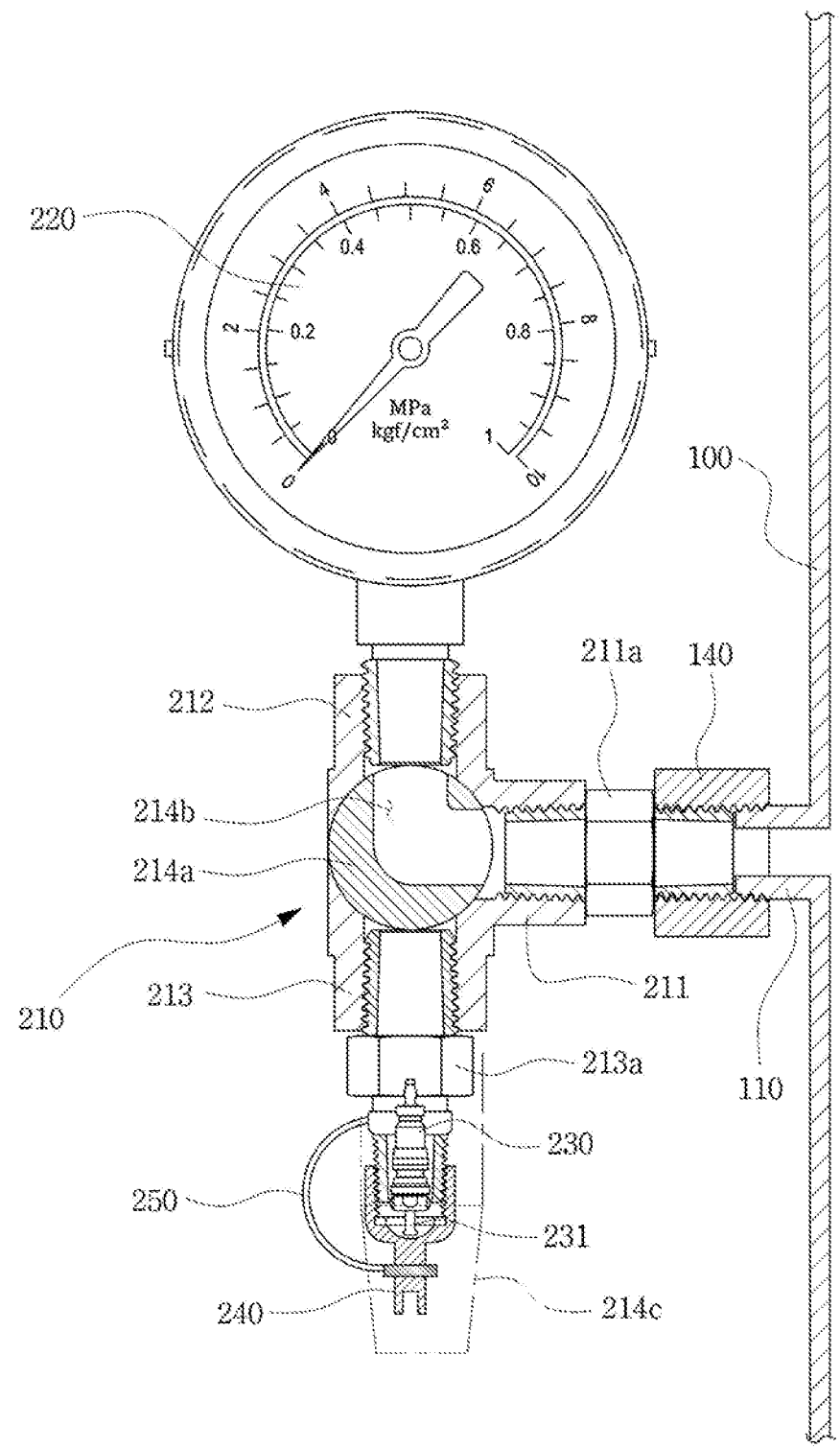
FIG. 5 is a detailed cross-sectional view illustrating the pressure regulation unit of the variable air pressure regulating device for an expansion tank according to the embodiment of the present invention.

FIG. 5 is a detailed cross-sectional view illustrating the pressure regulation unit of the variable air pressure regulating device for an expansion tank according to the embodiment of the present invention.

Referring to FIG. 5, the valve 214a of the flow-path setting member 214 has a variable flow path 214b formed at 90 degrees and penetrating in two directions.

The variable flow path 214b is rotated by the hand lever 214c and is rotated together with the rotation of the hand lever 214c so that a required flow path can be selectively set among the three flow paths.

Hereinafter, operation states of the variable air pressure regulating device for an expansion tank according to one embodiment of the present invention will be described in detail with reference to the accompanying drawings.

Figure 6A:
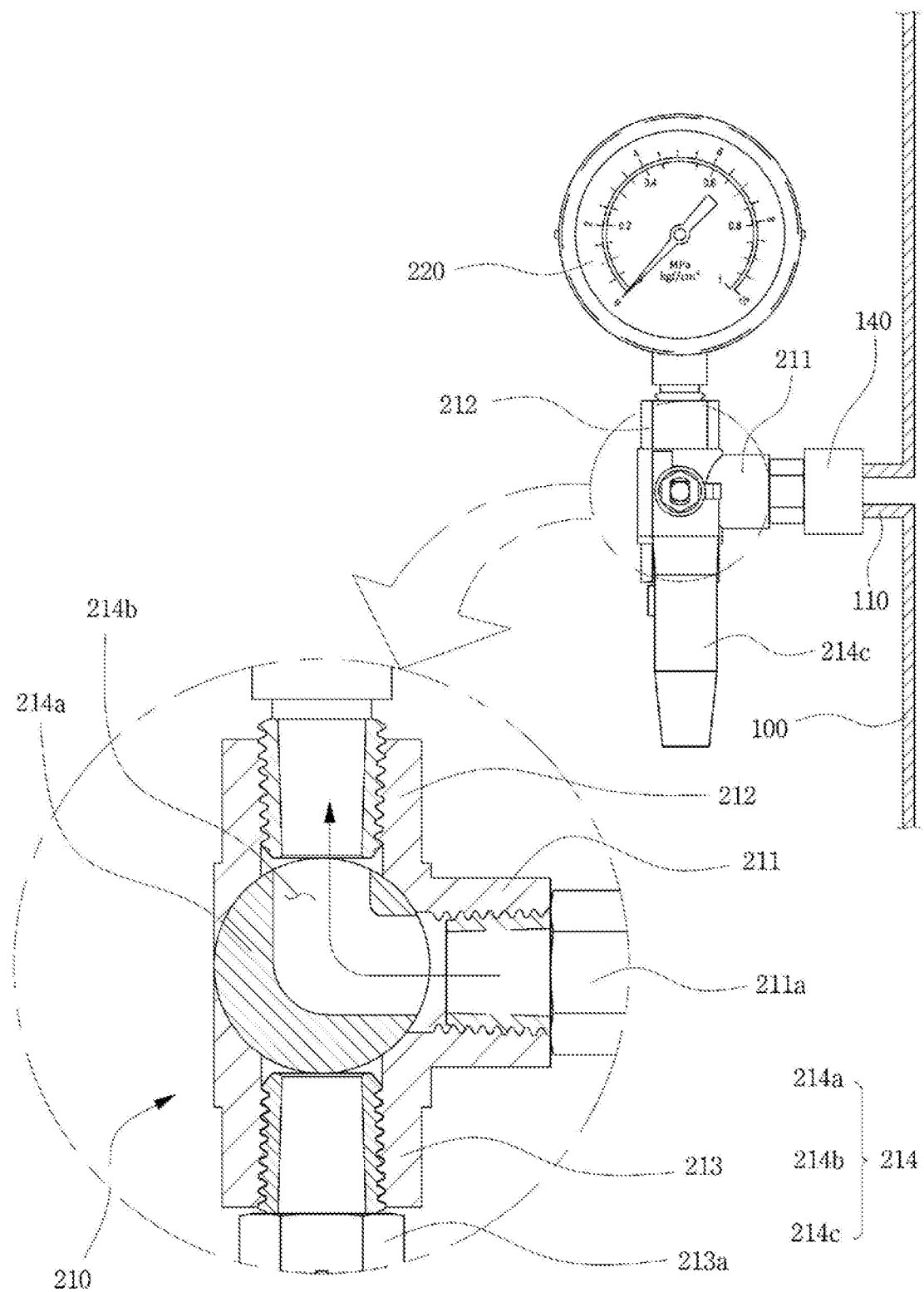
FIG. 6A is a cross-sectional view illustrating a state in which a flow path is changed only toward a pressure gauge side in the variable air pressure regulating device for an expansion tank according to the embodiment of the present invention.

FIG. 6A is a cross-sectional view illustrating a state in which a flow path is changed only toward a pressure gauge side in the variable air pressure regulating device for an expansion tank according to the embodiment of the present invention.

Referring to FIG. 6A, when the hand lever 214c of the flow path setting member 214 is rotated vertically downward, the variable flow path 214b formed in the valve 214a is connected to the expansion tank 100 and the pressure gauge 220, so that the pressure of the expansion tank 100 can be immediately checked through the pressure gauge 220.

Figure 6B:
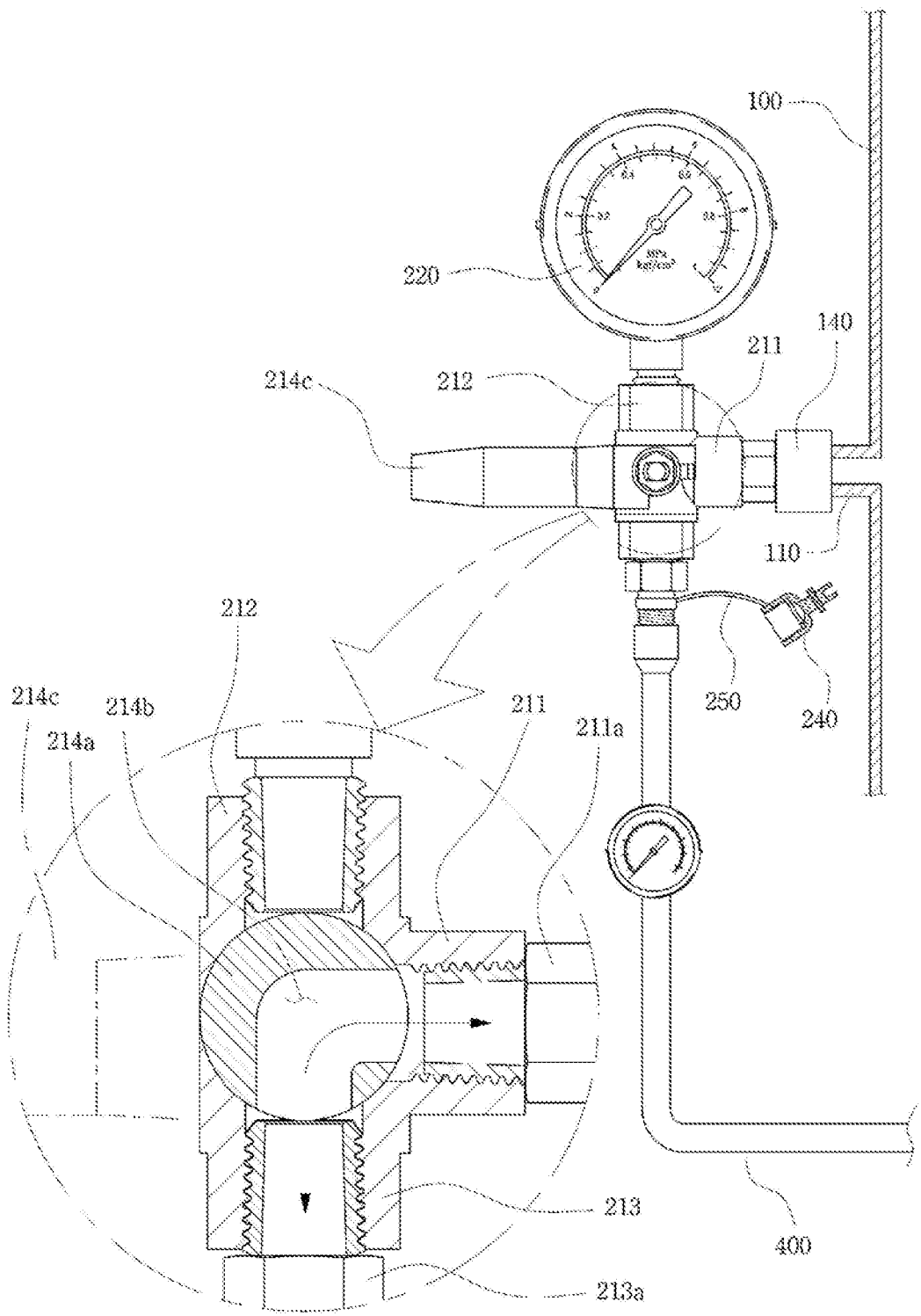
FIG. 6B is a cross-sectional view illustrating a state in which the flow path is changed only toward an air injecting device side in the variable air pressure regulating device for an expansion tank according to the embodiment of the present invention.

FIG. 6B is a cross-sectional view illustrating a state in which the flow path is changed only toward the air injecting device side in the variable air pressure regulating device for an expansion tank according to the embodiment of the present invention.

Referring to FIG. 6B, in the present invention, when the hand lever 214c is rotated 90 degrees to the left, the variable flow path 214b formed in the valve 214a forms a flow path only toward the expansion tank 100 and the valve core 230 side, so that it is possible to inject air directly into the expansion tank by using the air injecting device.

This flow path is used for the case where a separate pressure gauge is provided to the air injecting device 400. Since a large amount of air can be injected while checking the internal pressure of the expansion tank 100, it is possible to regulate the air pressure of the expansion tank 100) in a short time.

Figure 6C:
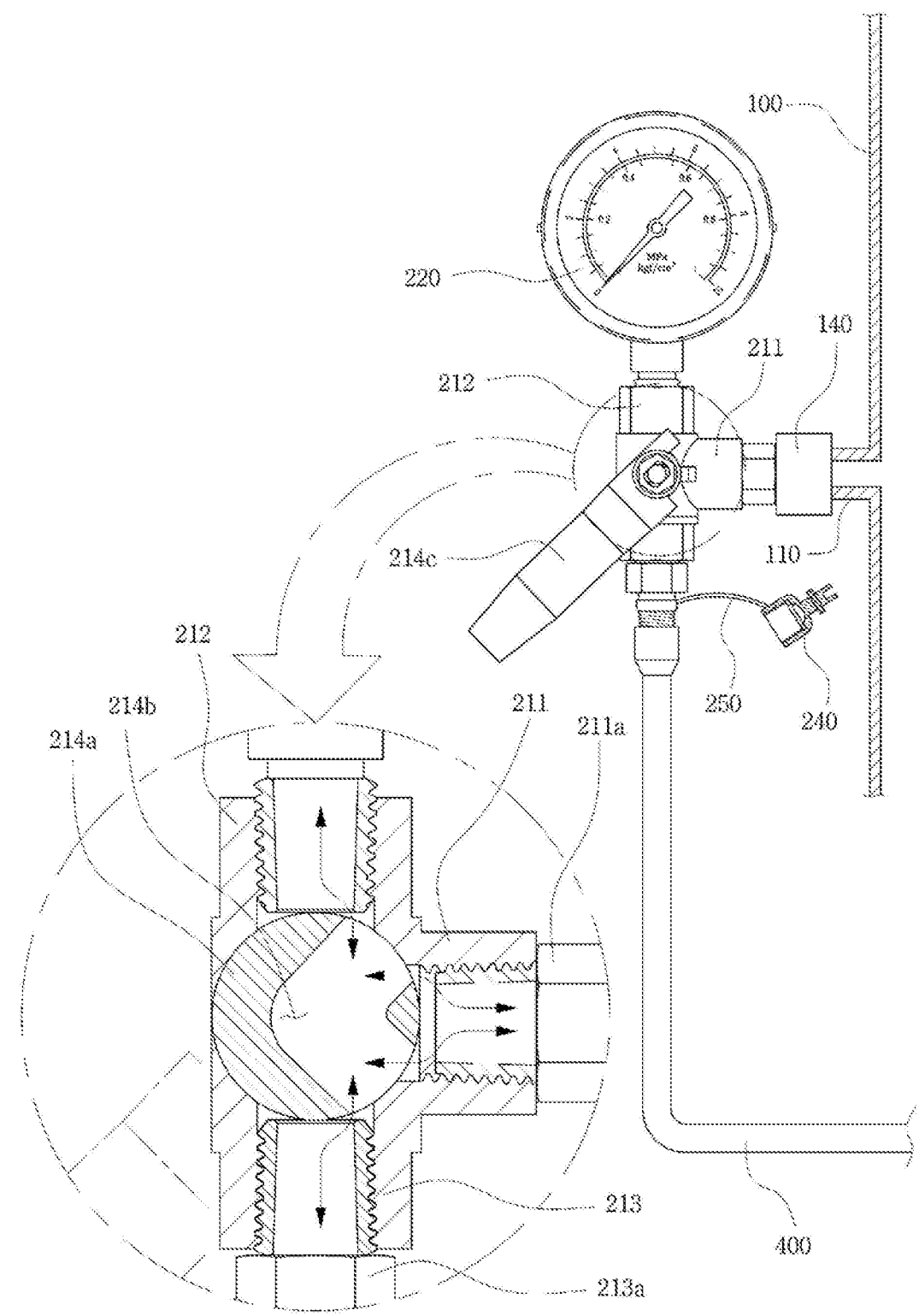
FIG. 6C is a cross-sectional view illustrating a state in which the flow path is changed to both of the air injecting device side and the pressure gauge side in the variable air pressure regulating device for an expansion tank according to one embodiment of the present invention.

FIG. 6C is a cross-sectional view illustrating a state in which the flow path is changed to both of the air injecting device side and the pressure gauge side in the variable air pressure regulating device for an expansion tank according to one embodiment of the present invention.

Referring to FIG. 6C, when the hand lever 214c is rotated in the direction of 45 degrees, the variable flow path 214b formed in the valve 214a is connected to all of the expansion tank 100, the valve core 230, and the pressure gauge 220.

Therefore, it is possible to inject air into the expansion tank 100 while checking the pressure of the pressure gauge 220 at the time of air injection.

This flow path is used for the case where there is no pressure gauge in the air injecting device or the case where air is discharged. Since air needs to be injected or discharged while checking the internal air pressure of the expansion tank, the flow path is formed in the two directions to inject or discharge the air.

As described above, in the present invention, the air pressure can be checked by the pressure regulation unit in maintaining the internal pressure of the expansion tank, and the air inside the expansion tank can be easily discharged or injected, so that it is possible to conveniently maintain and control the expansion tank.

INDUSTRIAL APPLICABILITY

The present invention relates to a variable air pressure regulating device for an expansion tank and is applied and used for cooling/heating pipes of buildings or large-scale facilities, and thus, the present invention can be used in industries related to air conditioning equipment and cooling/heating systems of buildings.

What is claimed is:
1. A variable air pressure regulating device for an expansion tank, comprising an expansion tank provided with a rubber bag therein, an air injection/discharge port at an outer side thereof, and a drain on a bottom thereof, the drain capable of discharging water to be leaked when the rubber bag is burst;

a pressure regulation unit capable of regulating an internal pressure of the expansion tank; and a regulation-unit cover coupled to the expansion tank to prevent the pressure regulation unit from being damaged, wherein the pressure regulation unit is connected to the air injection/discharge port and includes:

a three-way ball valve which is provided with an upper flow path, a lower flow path, and a side flow path formed in three directions of upward, downward, and sideward and provided with a flow path setting member capable of selectively setting a flow path at a center where the three flow paths meet;

a pressure gauge installed in the upper flow path of the three-way ball valve to check the internal pressure of the expansion tank; and a valve core installed in the lower flow path of the three-way ball valve to be capable of injecting or discharging air into or from the expansion tank, wherein the flow path setting member includes: a valve having a shape of a ball; a variable flow path in which two flow paths are formed in the valve at 90 degrees in a penetrating manner; and a hand lever by which the valve can be manipulated, wherein, when the hand lever is rotated vertically downward, the variable flow path forms a flow path toward the expansion tank and the pressure gauge, so that the pressure of the expansion tank can be checked through the pressure gauge, wherein, when the hand lever is rotated 90 degrees to the left, the variable flow path forms a flow path toward the expansion tank and the valve core, so that air can be injected into the expansion tank, and wherein when the hand lever is rotated toward a direction of 45 degrees, the flow path is set so that the variable flow path connects all of the expansion tank, the valve core, and the pressure gauge.

2. The variable air pressure regulating device according to claim 1, wherein a protective cap for protecting the valve core and a strap disposed between the protective cap and the valve core to connect and support the protective cap are provided outside the valve core.

* * * * *